No. 633,798. Patented Sept. 26, 1899.
A. L. CARLEY.
BALL BEARING FOR VEHICLES.
(Application filed Mar. 27, 1899.)
(No Model.)
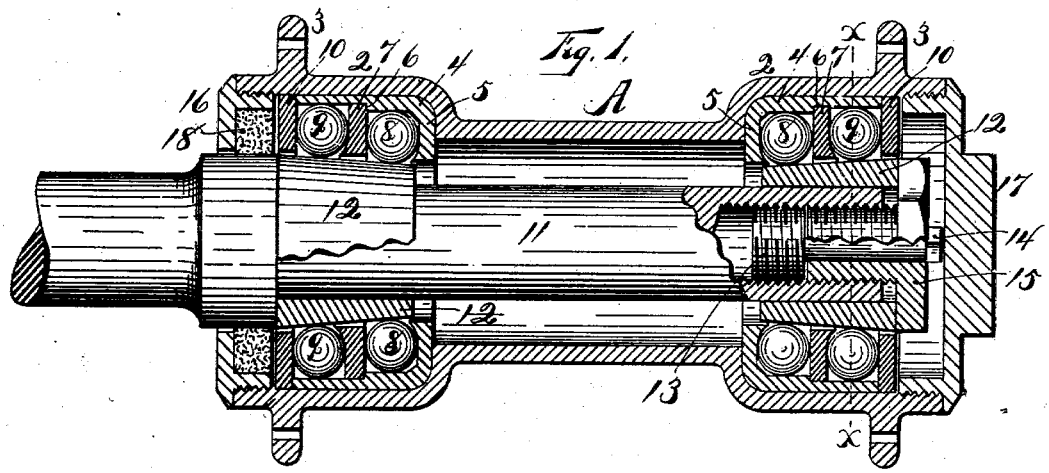
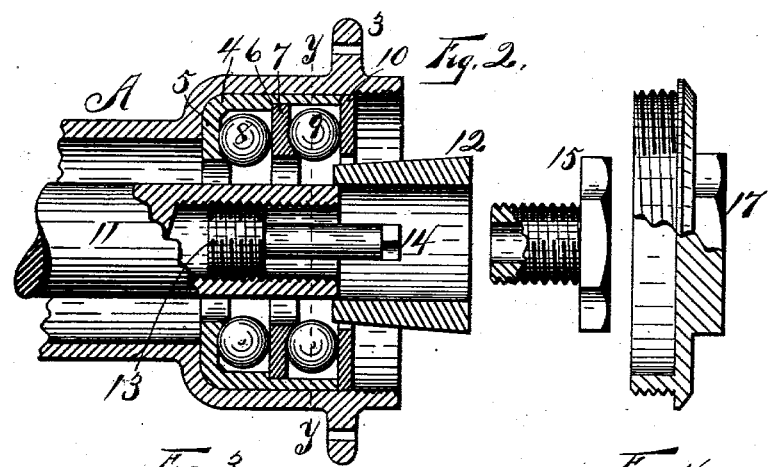
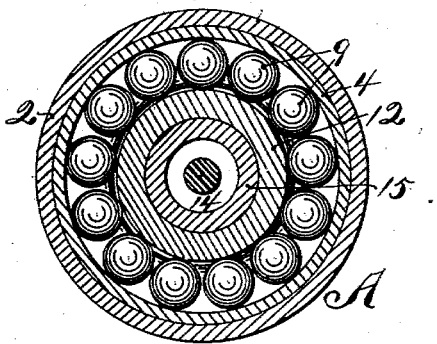
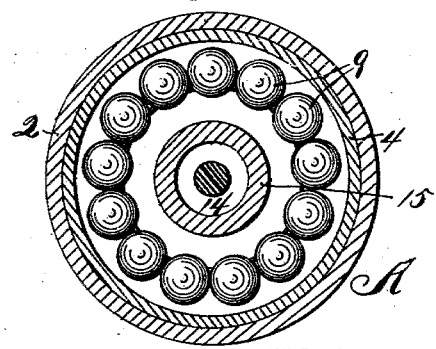
WITNESSES:
INVENTOR
Alexander L. Carley
BY
Smith & Denison
ATTORNEYS.

UNITED STATES PATENT OFFICE.

ALEXANDER L. CARLEY, OF SYRACUSE, NEW YORK.

BALL-BEARING FOR VEHICLES.

SPECIFICATION forming part of Letters Patent No. 633,798, dated September 26, 1899.

Application filed March 27, 1899. Serial No. 710,637. (No model.)

*To all whom it may concern:*

Be it known that I, ALEXANDER L. CARLEY, of Syracuse, in the county of Onondaga, in the State of New York, have invented new and useful Improvements in Ball-Bearings for Vehicles, of which the following, taken in connection with the accompanying drawings, is a full, clear, and exact description.

My invention relates to ball-bearings for vehicles.

My object is to provide a bearing having two sets of balls in parallel planes around a cylindrical axle, said balls having their respective bearings of unequal radii and adjusted to their bearings by means of a cone fitting over the axle and adjusted simultaneously to both bearings by a locking-screw within the shaft, all being inclosed by a flanged nut screwed into the head of the hub, which operates to prevent dust or grit getting into the bearings.

It is constructed as follows, reference being had to the accompanying drawings, in which—

Figure 1 is a longitudinal section of a cycle-wheel hub having my double ball-bearing at each end. Fig. 2 is a like view of one end thereof, showing the cone, lock-nut, and inclosing nut in detached positions. Fig. 3 is a cross-section on line $x\ x$ in Fig. 1. Fig. 4 is a like view on line $y\ y$ in Fig. 2.

A is a vehicle-hub having enlarged ends 2 and spoke-flanges 3. A cup 4 is removably seated in each end of the hub, having an inward flange 5, provided with a marginal ball-retaining lip, substantially as shown, and having also a shoulder 6, against which a ring 7 abuts, said ring having upon its inner edge a ball-retaining lip, substantially as shown. The shoulder 6 and ring 7 create two ball-chambers, the balls 8 being in the inner chamber between the flange 5 and ring 7 and the balls 9 in the one between said ring and the end ring or closure 10, which is suitably inserted or secured in the hub end exterior to said cup. An axle 11 is inserted through said cups, and 12 12 are cones loose upon said axle, one within each cup, and furnishing the inward bearing for both sets of balls, one cone abutting against the shoulder on the axle. The outer end of said axle is bored out and interiorly threaded to receive, first, the locking-screw 13, provided with a stem 14, and, secondly, to receive the tubular adjusting-nut 15, which fits over the stem of the locking-nut and bears against the cone, whereby when the cone is adjusted the locking-screw can be screwed up against the inner end of the outer nut to lock it. Flanged and exteriorly-threaded cap-nuts 16 17 are screwed into the ends of the hub, the nut 16 inclosing a suitable packing-ring 18, and the nut 17 closing that end of the hub entirely. In case this bearing is used on a cycle then two nuts 16 would be used, the axle projecting through both of them.

The adjustment of one cone will equally adjust the other. One set of balls will do the work if the other becomes disabled. All end thrusts of the axle is eliminated. The cone-bearing and ball-chambers of unequal radii enable me to use balls of equal size in either.

It will be seen that the lock-screw remains stationary after the bearing has been once set, even though the adjusting-nut and cone be removed, so that when the parts are replaced the bearing of the cone against the balls will be the same as before.

What I claim as my invention, and desire to secure by Letters Patent, is—

1. In a ball-bearing, the combination with an axle bored out and threaded interiorly, a cone against which the balls of the bearing bear inwardly, and said balls having a suitable mounting, of a locking-screw in the bore of said axle, a nut screwed into said axle-bore and bearing against said cone, and means to cause said locking-screw to bear against the inner end of said adjusting-screw and lock it.

2. In a ball-bearing, the combination with an axle bored out and interiorly threaded, a cone movable upon said shaft, and the balls of a ball-bearing engaging with said cone, of a locking-screw inserted into said shaft and provided with a stem, and a tubular adjusting-nut fitting over said stem and screwed into said axle, whereby the said adjusting-nut, adjusts the cone and is locked by said locking-screw screwed outwardly against it.

In witness whereof I have hereunto set my hand this 13th day of March, 1899.

ALEXANDER L. CARLEY.

Witnesses:
MILDRED M. NOTT,
HOWARD P. DENISON.